(12) United States Patent
Naoki (10) Patent No.: US 7,718,108 B2
(45) Date of Patent: May 18, 2010

(54) METHOD OF MANUFACTURING A FUEL CELL BIPOLAR PLATE

(75) Inventor: Shiji Naoki, Okazaki (JP)

(73) Assignee: Nisshinbo Industries Inc., Tokyo (JP)

( * ) Notice: Subject to any disclaimer, the term of this patent is extended or adjusted under 35 U.S.C. 154(b) by 686 days.

(21) Appl. No.: 11/353,163

(22) Filed: Feb. 14, 2006

(65) Prior Publication Data

US 2006/0199065 A1    Sep. 7, 2006

(30) Foreign Application Priority Data

Mar. 7, 2005    (JP) .............................. 2005-061768

(51) Int. Cl.
*B28B 1/00*    (2006.01)
(52) U.S. Cl. ...................... 264/299; 264/319
(58) Field of Classification Search ................. 264/319, 264/299, 239, 104, 322; 425/110, 458; 429/12
See application file for complete search history.

(56) References Cited

U.S. PATENT DOCUMENTS 2,104,529 A * 1/1938 Rodnick ..................... 425/449

6,746,792 B2 * 6/2004 Hasegawa et al. ............. 429/34
2003/0190516 A1 * 10/2003 Tanno .......................... 429/34
2005/0123822 A1 * 6/2005 Ishikawa et al. .............. 429/39

FOREIGN PATENT DOCUMENTS

| JP | 2000-77081 A1 * | 3/2000 |
| JP | 2000-77081 A1 | 3/2001 |
| JP | 2001-62858 A1 | 3/2001 |
| JP | 2001-85030 A1 | 3/2001 |
| JP | 2003-338268 A1 | 11/2003 |

* cited by examiner

*Primary Examiner*—Khanh Nguyen
*Assistant Examiner*—Saeed M Huda
(74) *Attorney, Agent, or Firm*—Orion Consulting, Ltd; Joseph P. Farrar (57) ABSTRACT

A method of manufacturing a fuel cell bipolar plate that improves dimensional accuracy even with viscous material, eliminates the need for large-scale production equipment such as a press to make a pre-formed product, and furthermore, enables manufacturing time for the fuel cell bipolar plate to be reduced. Powdered raw material A containing electrically conductive material and resin is dropped into a filling container so that a top thereof is flat. The powdered raw material A inside the filling container is then heated to form a temporary cast B, the temporary cast B is set in a mold in which a predetermined pattern is formed, and heated and compressed to form a fuel cell bipolar plate.

5 Claims, 7 Drawing Sheets

| | Embodiment 1 | Embodiment 2 | Comparative Example 1 | Comparative Example 2 | Comparative Example 3 |
|---|---|---|---|---|---|
| Method of dropping raw material into mold | Dropping apparatus | Dropping apparatus | Dropped directly | Dropping jig | Pellet |
| Resin used | Epoxy | Phenol | Epoxy | Epoxy | Epoxy |
| Casting size (mm) | 300 L x 400 W | 300 L x 400 W | 300 L x 400 W | 300 L x 400 W | 300 L x 400 W |
| Number of measurement points (number of measurements) | 20 | 20 | 20 | 20 | 20 |
| Thickness disparity (Max-Min) (mm) | 0.04 | 0.04 | 0.2 | 0.15 | -- |
| Condition of casting | Good | Good | Uneven thickness | Uneven thickness | Uneven thickness; casting defective |

METHOD OF MANUFACTURING A FUEL CELL BIPOLAR PLATE

BACKGROUND OF THE INVENTION

1. Field of the Invention

The present invention relates to a method of manufacturing a fuel cell bipolar plate, and more particularly, to a method of manufacturing that enables a fuel cell bipolar plate having superior dimensional accuracy to be manufactured efficiently.

2. Background of the Invention

A type of fuel cell that generates electric power by the electrochemical reaction of a fuel gas and an oxidizing gas, in particular a solid polymer type fuel cell, shows promise as a clean, renewable power source in a variety of applications. Such a fuel cell is comprised of an ion-conducting electrolyte membrane sandwiched between an anode and a cathode, the anode and cathode each composed of a gas diffusion electrode coated with a catalyst, the outsides of the electrodes being further provided with a bipolar plate. The bipolar plate at the anode supplies hydrogen as the fuel gas to the anode and the bipolar plate at the cathode supplies oxygen as the oxidizing gas to the cathode.

Figure 8A:
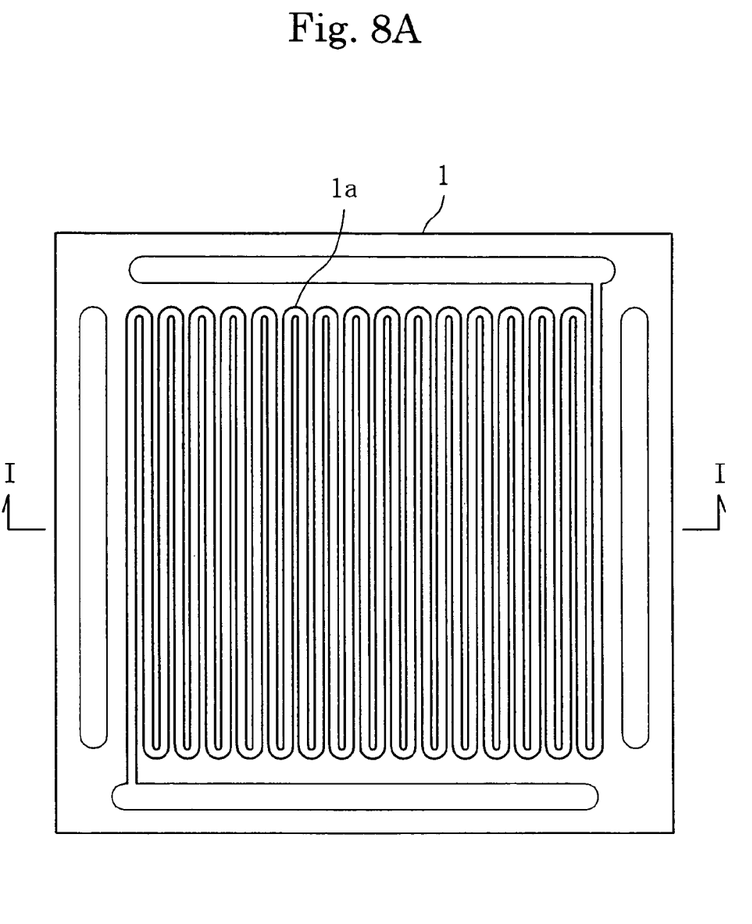
FIGS. 8A and 8B are diagrams showing a fuel cell bipolar plate, with FIG. 8A showing a plan view and FIG. 8B showing a cross-sectional view along a line I-I shown in FIG. 8A.
Figure 8B:
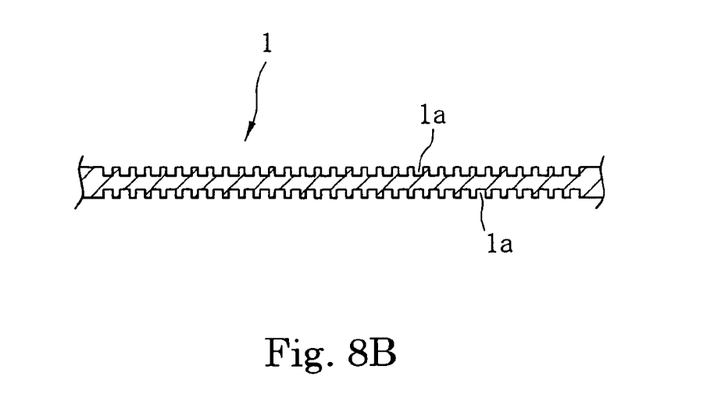

FIGS. 8A and 8B show an example of such a bipolar plate. As shown in the diagrams, a pattern 1a consisting of narrow grooves created by variations in thickness is formed on a planar surface of a fuel cell bipolar plate 1. In order to increase the overall surface area of contact between the gas diffusion electrode and the gas, the grooves meander with a slight pitch over the entire surface of the fuel cell bipolar plate. The groove pattern 1a may be formed on both sides of the fuel cell bipolar plate, as shown in FIG. 1B, or on one side only.

In addition to the configuration described above, there are also fuel cell bipolar plates having other types of structures, in which the projections are arrayed on one or both sides of the bipolar plate and the gaps between the projections used as passages for gas, or in which a combination of projections and the configuration described above is used.

The fuel cell bipolar plate described above requires the following characteristics:

(1) Gas impermeability. The fuel cell bipolar plate must be impermeable to the hydrogen and oxygen gases supplied to the electrodes. Typically, a fuel cell is formed into a cell stack consisting of many individual cell units stacked together, with each cell unit consisting of a central solid polymer-type electrolyte membrane, gas diffusion electrodes on both sides of the electrolyte membrane, and bipolar plates outside both electrodes. Therefore, gas is flowing to at least one side of the fuel cell bipolar plate, and if the bipolar plate were gas-permeable it would degrade the power generating efficiency of the cell or render power generation itself impossible, causing the cell to cease to function as a cell.

(2) Electrical conductivity. Electrical conductivity is essential because the fuel cell bipolar plate acts as an electrode for the fuel cell.

(3) High dimensional accuracy, that is, thickness accuracy. Electric current flows through the contact between the bipolar plate and the anode or cathode, and therefore poor dimensional accuracy decreases the surface area of contact and degrades electrical conductivity. In addition, poor dimensional accuracy may cause gaps to develop between the fuel cell bipolar plate and the anode or cathode, which can result in cracks in the fuel cell bipolar plate if force is applied to the bipolar plate in such a direction as to compress the gaps. Dimensional accuracy is assessed by measuring the thickness of the fuel cell bipolar plate at predetermined measurement points on a single bipolar plate and obtaining a difference d between a maximum thickness Tmax and a minimum thickness Tmin. The smaller the difference d, the better the performance of the fuel cell.

In order to satisfy the above-described requirements, initially the fuel cell bipolar plate was made by machining of a graphite plate. However, machining took time and the resulting bipolar plate was prohibitively expensive.

More recently, a method of manufacturing the fuel cell bipolar plate has been adopted that uses a powdered raw material composed of a mixture of carbon powder and thermosetting synthetic resin powder. This raw material is poured into a bottom half of a mold (hereinafter "bottom mold") of a press machine and covered with a top half of the mold (hereinafter "top mold") thereof, with the press then supplying pressure and heat to form the fuel cell bipolar plate.

However, it is not possible to achieve precise thicknesses for the finished fuel cell bipolar plate with such a method of formation. For example, with the conventional method of formation described above, a difference d described above of 0.2 mm or more has been observed in the dimensional accuracy of a fuel cell bipolar plate of approximately 200 mm a side, which adversely affects the performance of the fuel cell.

In order to solve this problem, Japanese Laid-Open Patent Publication (Kokai) No. 2001-62858 proposes a powdered raw material dropping device having a dropping part having a plurality of downward-facing dropping ports arranged in a matrix-like formation, a slide plate slidably movable between a position at which all the dropping ports are closed and a position at which all the dropping ports are open, and a base that supports such dropping part and slide plate.

Such a method produces much better dimensional accuracy than hitherto existing methods and can produce a uniform thickness. However, because the raw material drops straight down from the dropping ports, the raw material that is deposited tends to concentrate at the center rather than at the periphery, leading to marked differences in the density of the fuel cell bipolar plate if the raw material is viscous.

In addition, Japanese Laid-Open Patent Publication (Kokai) No. 2001-85030 proposes a method in which the powdered raw material is preformed into a tablet and the tablet is then dropped into the mold. According to this method, the powdered raw material can be given a uniform consistency by forming it into a tablet. However, this method necessitates applying a heavy load to the tablet and spreading the material to the edges of the mold when forming the tablet. Consequently, if the powdered raw material is viscous, the edges of the table tend to be neglected when casting an article having a large surface area, thus making it difficult to achieve uniformity. Moreover, non-uniformity tends to occur in the dropping of the tablet into the mold as well, which tends to create uneven thickness.

In an effort to ensure uniformity of thickness and quality, Japanese Laid-Open Patent Publication (Kokai) No. 2004-338268 proposes a method that involves dropping powdered raw material inside a hopper into the bottom mold while moving the hopper from one end of the mold to the other so as to supply powdered raw material up to a certain height.

However, such a method has several problems. Once the dropping of the powdered raw material into the bottom mold stops, the top mold descends and pressure is applied to the powdered raw material, and at the same time the mold is heated and the resin contained in the powdered raw material melts or hardens. Therefore, from at least the second time onward the powdered raw material is dropped into a bottom mold that is already rather hot, and as a result the powdered raw material that drops from the hopper first immediately begins to melt or harden, bringing further movement or hardening to a complete halt and making it difficult to obtain dimensionally consistent castings.

In addition, Japanese Laid-Open Patent Publication (Kokai) No. 2000-77081 proposes a method that involves compressing the powdered raw material into a preliminary casting at low temperature, dropping the preliminary casting into the mold and then compressing and heating it to form the fuel cell bipolar plate.

However, such a method requires a press machine in order to create the preliminary casting. A press is an expensive piece of machinery and its addition turns production facilities into large-scale works, which in turn increases the cost of the fuel cell bipolar plate. Moreover, time is required for the press process that turns the powdered raw material into, a preliminary casting at low temperature. In addition, output is adversely affected by deformation due to spring-back since pressure is applied during preliminary casting, as well as by impurities contaminating the preliminary casting and from damage to the preliminary casting because it is handled directly by hand. Finally, in order to give the finished casting consistently uniform dimensions and density, the preliminary casting itself must be consistently uniform, which is difficult to do.

It should be noted that methods 1-3 described above drop the powdered raw material or the tablet directly into the mold, which takes time and effort and increases the number of steps in the manufacturing process, thereby reducing production efficiency.

SUMMARY OF THE INVENTION

Accordingly, the present invention is conceived as a solution to the above-described problems of the conventional art, and has as an object to provide a method of manufacturing a fuel cell bipolar plate that improves dimensional accuracy even with viscous material, eliminates the need for large-scale production equipment such as a press to make a preliminary casting, and furthermore, enables manufacturing time for the fuel cell bipolar plate to be reduced.

To achieve the above-described object of the present invention, the present invention provides a method of manufacturing a fuel cell bipolar plate comprising:

a step of dropping powdered raw material containing electrically conductive material and resin into a filling container so that a top of the powdered raw material is flat;

a step of heating the powdered raw material within the filling container into a temporary casting; and a step of dropping the temporary casting into a mold in which a predetermined pattern is formed and heating and compressing the temporary casting to form the fuel cell bipolar plate.

Preferably, the filling container is turned upside down when the temporarily cast powdered raw material is dropped into the mold in which a predetermined pattern is formed, the step of dropping powdered raw material containing electrically conductive material and resin into a filling container so that a top of the powdered raw material is flat is a step that puts the powdered raw material into a hopper and drops the powdered raw material uniformly from a supply port at a bottom of the hopper while maintaining a distance between the supply port at a bottom of the hopper and the filling container at a fixed distance and moving the hopper and the filling container relative to each other, a supply port of the hopper slides over the top of the filling container so as to level off the powdered raw material dropped into the filling container, and the filling container has a pattern corresponding to a thickness pattern of the fuel cell bipolar plate. Preferably, the resin contains thermosetting resin, a temperature at which the powdered raw material is heated being higher than the melting point of the thermosetting resin but lower than the thermosetting temperature of the thermosetting resin, or the resin contains crystalline thermoplastic resin, a temperature at which the powdered raw material is heated being higher than the melting point of the crystalline thermoplastic resin but lower than the dissolution temperature of the crystalline thermoplastic resin, or the resin contains amorphous thermoplastic resin, a temperature at which the powdered raw material is heated being higher than the glass transition point of the amorphous thermoplastic resin but lower than the dissolution temperature of the amorphous thermoplastic resin.

Filling the filling container with powdered raw material and leveling off the powdered raw material so that the top is flat and heating the filling container together with the powdered raw material melts the resin mixed into the powdered raw material and fuses it with grains of powdered raw material. This fusion may be accomplished by the melting of a small portion of the resin or it may be accomplished by the melting of substantially all of the resin to achieve a stronger fusion. If the resin is a thermosetting resin, then the heating temperature is equal to or higher than the melting point of the resin but lower than the setting temperature of the resin. If the resin is a crystalline thermoplastic resin, then the heating temperature is higher than the melting point of the resin but lower than the dissolution temperature of the resin. If the resin is an amorphous thermoplastic resin, then the heating temperature is higher than the glass transition point of the resin but lower than the dissolution temperature of the resin.

With respect to the temporary casting formed as described above, it is sufficient if it is not allowed to fall, when the container is inverted, so that, when the temporary casting is removed from the container, the temporary casting may be formed either weakly, that is, capable of crumbling when touched, or more strongly, as with a baked cookie, for example. The temporary casting is then put into the mold, compressed, and heated to a temperature at or above the setting temperature (if the resin is a thermosetting resin) or the glass transition point (if the resin is a thermoplastic resin) to form the fuel cell bipolar plate.

The method of manufacturing a fuel cell bipolar plate according to the present invention enables all the powdered raw material to be dropped evenly and simultaneously into the mold, and therefore provides the extraordinary effect of improving the dimensional accuracy of the formed fuel cell bipolar plate. Moreover, using the supply port of the hopper to scrape the top of the filling container enables excess powdered raw material to be removed efficiently, thereby allowing production time to be shortened.

In addition, a pattern that corresponds to the thicknesses of the fuel cell bipolar plate is formed in the filling container and the amount of powdered raw material dropped into the mold is adjusted to the shape of the mold, thus allowing the dimensional accuracy of the fuel cell bipolar plate to be further improved.

Furthermore, the method of manufacturing a fuel cell bipolar plate according to the present invention enables the powdered raw material to be dropped into the filling container first and then temporarily cast, thereby simplifying the dropping procedure (e.g., eliminating the need to level off the powdered raw material) compared to an arrangement in which the powdered raw material is dropped directly into the mold without such pre-casting as well as indirectly reducing the time needed to heat and press the temporary cast into a finished cast product, and therefore shortening the time required to manufacture the fuel cell bipolar plate.

Other features, objects and advantages of the present invention will be apparent from the following description when taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described with reference to the accompanying drawings.

Figure 1:
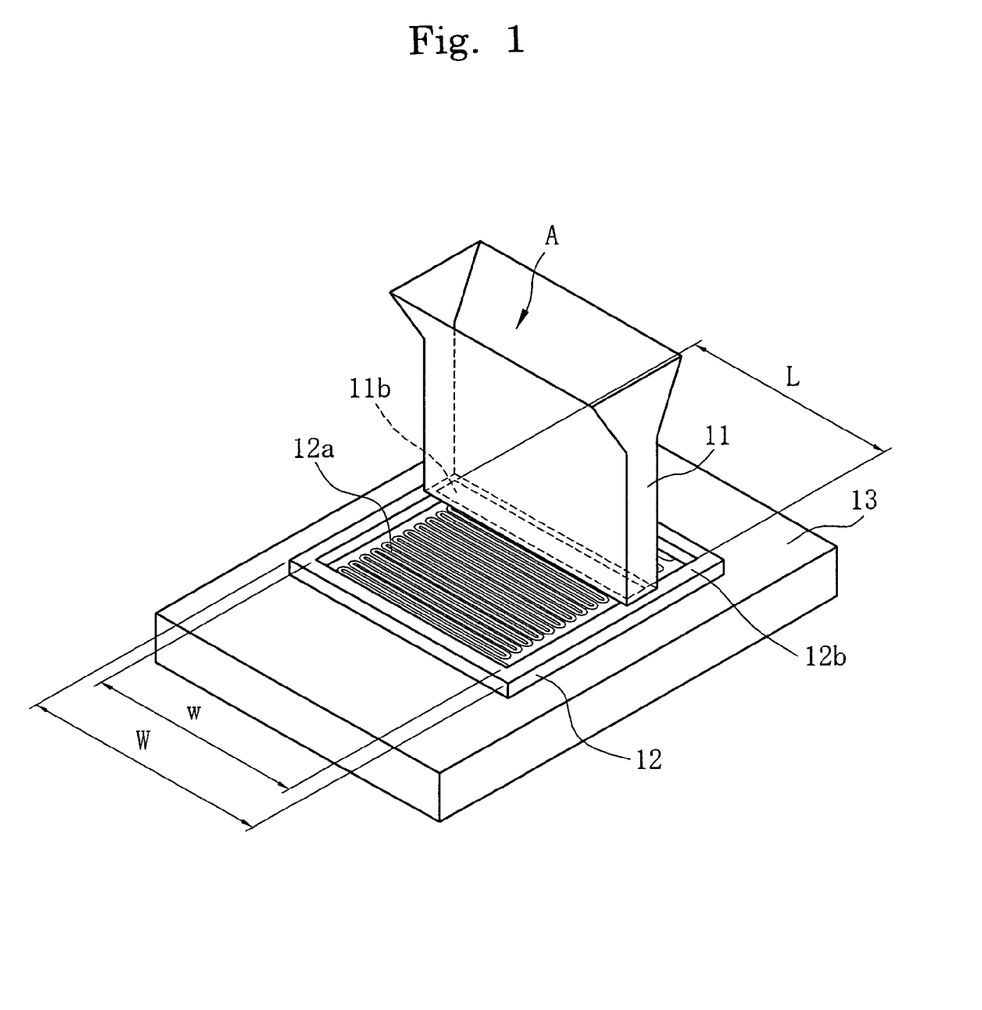
FIG. 1 is a diagram showing a perspective view of the main parts of a powdered raw material dropping apparatus of the present invention.
Figure 2:
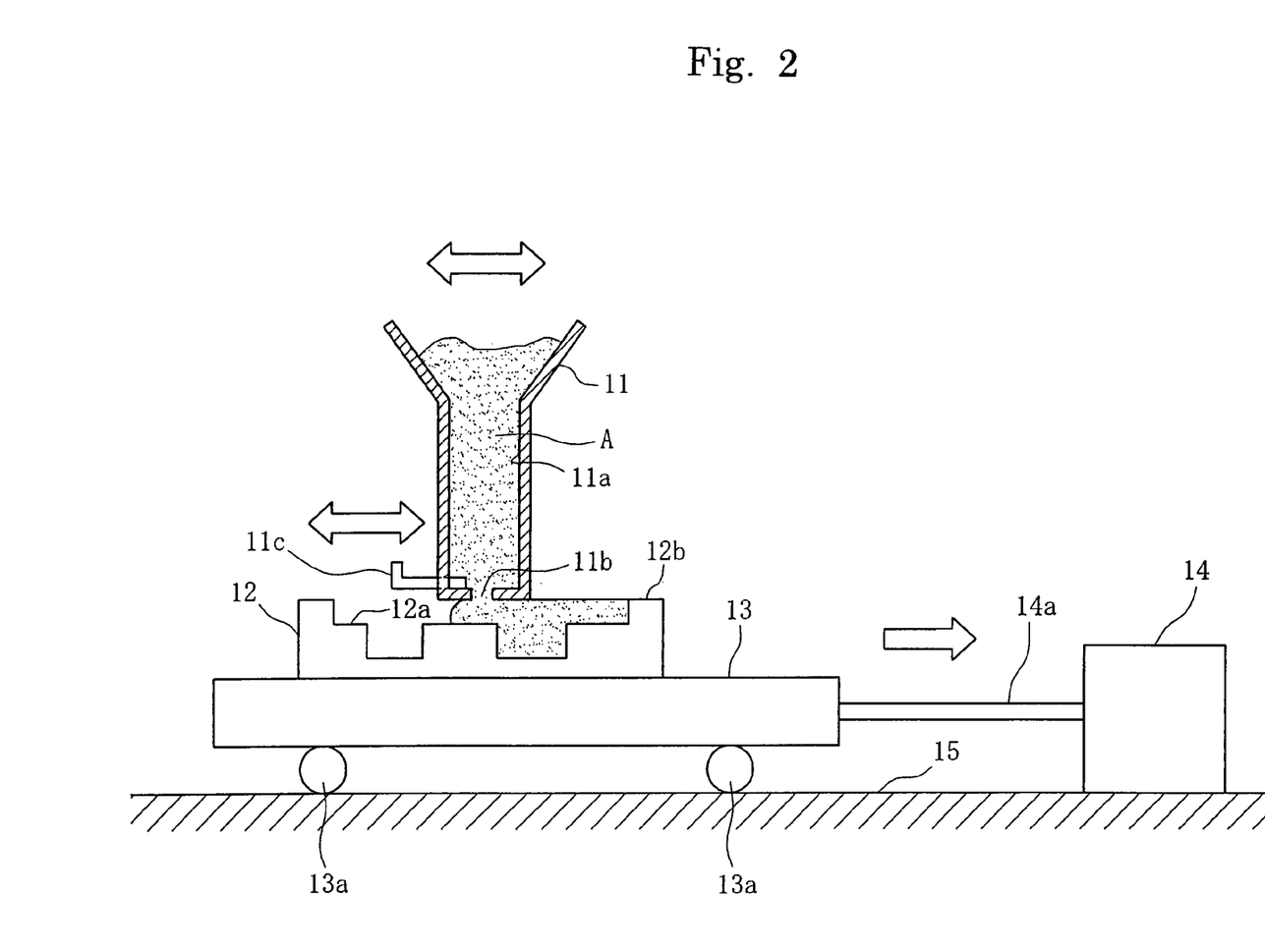
FIG. 2 is a schematic diagram showing a front view of a state in which a filling container is filled with the powdered raw material.

FIG. 1 is a diagram showing a perspective view of the main parts of a powdered raw material dropping apparatus of the present invention. FIG. 2 is a schematic diagram showing a front view of a state in which a filling container is filled with the powdered raw material.

As can be seen in the diagrams, a hopper 11 has an internal space 11a, open at a top direction and from which top direction powdered raw material A is dropped into the hopper 11. Along and narrow rectangular-shaped supply port 11b is formed at a bottom of the hopper 11. The supply port 11b may be provided with a lid 11c that slides over the supply port 11b to close or open the supply port 11b. Lumps in the powdered raw material A disrupt the uniform consistency of the raw material, and therefore a net-like sieve may be fitted over supply port 11b. The hopper is supported by a support, not shown, and is vibratable in a horizontal plane in the directions indicated by the arrows in FIG. 2 by a vibrator installed on the support or on the hopper 11. A rotary vibrator, a piston vibrator or the like may be used as the vibrator.

A pattern 1a is formed in a filling container 12 that is either the same as a pattern 1a of the fuel cell, bipolar plate or takes into account the distribution of thicknesses of the fuel cell bipolar plate. The material of the filling container 12 may be the same as the material of the mold that forms the fuel cell bipolar plate 1. However, because there is no application of pressure by a press, there is no particular need for the material to be strong, provided that such material does not deform when heated to the melting point of the resin powder and can withstand such heat. Moreover, considering that the filling container 12 must be transported during heating and dropping of the powdered raw material A, it is preferable that it be made of a light-weight material. Furthermore, in order to ensure that the powdered raw material A is heated uniformly throughout when heated by a heater or the like, it is preferable that the filling container 12 be made of a material with good thermal conductivity. Given these considerations, it is preferable to use a material such as aluminum for the filling container 12.

Generally, the relation between a width w of openings in the filling container 12 and an overall outside width W of the filling container 12 and a length L of the supply port 11b of the hopper 11 is such that $w \leq L < W$. When the hopper 11 is properly positioned at the filling container 12, the supply port 11b is covered by the filling container 12. If $L < w$ the powdered raw material A will not go evenly into the filling container 12, and if $W < L$ the powdered raw material A spills over the sides of the filling container 12 and is wasted. It should be noted, however, that in some cases $L < w$ due to the circumstances of processing.

The filling container 12 is placed substantially horizontally on a mobile stand 13, with a top 12b thereof forming a substantially horizontal flat surface. The mobile stand 13 has wheels 13a, is placed atop a rail or other base 15, and is connected thereto by a rod 14a or the like of a moving means 14 so as to be movable across the top of the base 15. For example, making the rod 14a a rack and providing a pinion on the moving means 14, and rotating the pinion in forward and in reverse by a motor, enables the mobile stand 13 to be driven laterally to the left and the right in FIG. 2 on the base 15. Alternatively, a uniaxial robot or a hydraulic cylinder may be used. The supply port 11b of the hopper 11 is positioned approximately 0.1-1 mm from the top 12b of the filling container 12, so as to slide over the top 12b of the filling container 12.

Next, a description is given of the method of manufacturing a fuel cell bipolar plate of the present invention.

A mixture of an electrically conductive material and resin may be used as the powdered raw material A. Graphite is usually used as the electrically conductive material, and may be either synthetic graphite or natural graphite. It is possible to use either a thermoplastic resin or a thermosetting resin as the resin, and phenol resin, urea resin and epoxy resin are commonly used for the thermosetting resin. There are no particular limitations on what may be used for the thermoplastic resin, and thus a variety of thermoplastic resins may be used.

As for the proportions of the mixture, the fuel cell bipolar plate 1 can be manufactured so long as the percentage by weight of the electrically conductive material of the powdered raw material A is in the range of 30-95 percent. Formation becomes difficult if the percentage by weight of the electrically conductive material of the powdered raw material A exceeds 95 percent, and electrical conductivity is insufficient if the percentage by weight is less than 30 percent. Moreover, although the powdered raw material A may be used as a powder, it may also be formed into granules after the raw ingredients have been mixed together.

The filling container 12 is placed on the mobile stand 13 so that an edge of an opening in the filling container 12 is positioned substantially at the center of the supply port 11b of the hopper 11 (it should be noted that here, a lid 11c is not provided on the supply port 11b) and powdered raw material A is dropped into the hopper 11. At the same time, the hopper 11 is vibrated by the vibrator in the lateral direction in FIG. 2, allowing the powdered raw material A inside the hopper 11 to fall smoothly without snagging on the way down.

Once the powdered raw material A is dropped into the hopper 11, the powdered raw material A falls, filling in the filling container 12 below the bottom of the supply port 11b and then filling the space 11a inside the hopper 11 with the powdered raw material A. When the mobile stand 13 is moved in the directions of the arrows shown in FIG. 2 in this state, the powdered raw material A in the hopper 11 fills the interior of the filling container 12 while excess powdered raw material A is scraped away by the supply port 11b of the hopper 11 so that the top thereof is a flat surface. A scraping plate, not shown, may be provided for the purpose of scraping the top of the filling container 12.

Figure 3:
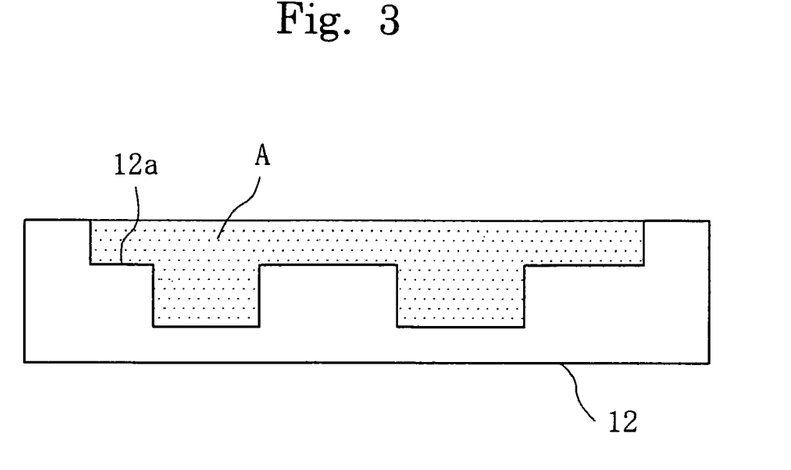
FIG. 3 is a diagram showing a state in which space within the filling container is filled with the powdered raw material.

Once the filling container 12 is finished passing beneath the supply port 11b, then, as shown in FIG. 3, the space in the filling container 12 is filled with the powdered raw material A.

Thereafter, the filling container 12 is placed on a heating stand, not shown, and the powdered raw material A is heated by a heater or other such heating instrument to near the melting point of the resin contained in the raw material and maintained in that state. If the resin is a thermoplastic resin, the powdered raw material A is heated to a temperature that is above the melting point but below the dissolution temperature of the resin (if the thermoplastic resin is crystalline), to a temperature that is above the glass transition point but below the dissolution temperature of the resin (if the thermoplastic resin is an amorphous thermoplastic resin), or to a temperature that is above the melting point but below the setting temperature of the resin (if the resin is a thermosetting resin).

If the heating temperature is too low, the resin does not melt, and therefore the powdered raw material A cannot be temporarily cast and cannot be dropped all at once into the mold. On the other hand, if the heating temperature is too high, the thermosetting resin begins to set and causes localized disparities in dimension and density in the casting.

Especially in the case of thermosetting resin, it is preferable that the heating temperature be from Tm to Tm+50 degrees Centigrade, where Tm is the melting point, and even more preferably from Tm to Tm+20 degrees Centigrade. It should be noted that, when using a combination of thermosetting resin and thermoplastic resin, the foregoing points are to be taken into consideration in setting the heating temperature.

The powdered raw material A that has been heated inside the filling container 12 as described above enters a state in which a portion of the resin contained in the powdered raw material A melts and grains fuse together lightly, and does not immediately fall even when the filling container 12 is turned upside down. This state is what is referred to as temporary casting in this specification, and that which is temporarily cast in this manner is called a temporary cast B. Conventionally, it has been difficult to drop all the powdered raw material A at once when the powdered raw material A is dropped into the mold. However, using the method of the present invention of setting the temporary cast B into the mold enables all of the powdered raw material A to be dropped into the mold at once, making it easy to carry out consistent setting of the temporary cast B in the mold.

In this specification, the temporary cast B means a state in which the resin in the powdered raw material A melts and fuses together. The extent of that fusion may be on the order of a portion of the resin melting, such that the temporary cast B does not immediately fall from the filling container 12 when the filling container 12 is inverted, or it may on the order of all the resin melting and the powdered raw material A having the consistency of a baked cookie, that is, that which can be bent and which crumbles when handled with a certain amount of force but which does not crumble or suffer damage from the application of a small amount of force. However, if the powdered raw material A is heated until it is hard, the resin begins to harden or deteriorate, which can lead to casting defects and deterioration of the physical properties of the cast product. Moreover, such a hardened temporary casting is hard to remove from the filling container 12 and could be difficult to drop into the mold, and therefore it is preferable that the powdered raw material A be heated and hardened only to that point at which the temporary casting does not immediately fall from the filling container 12 when the filling container 12 is inverted.

Figure 4:
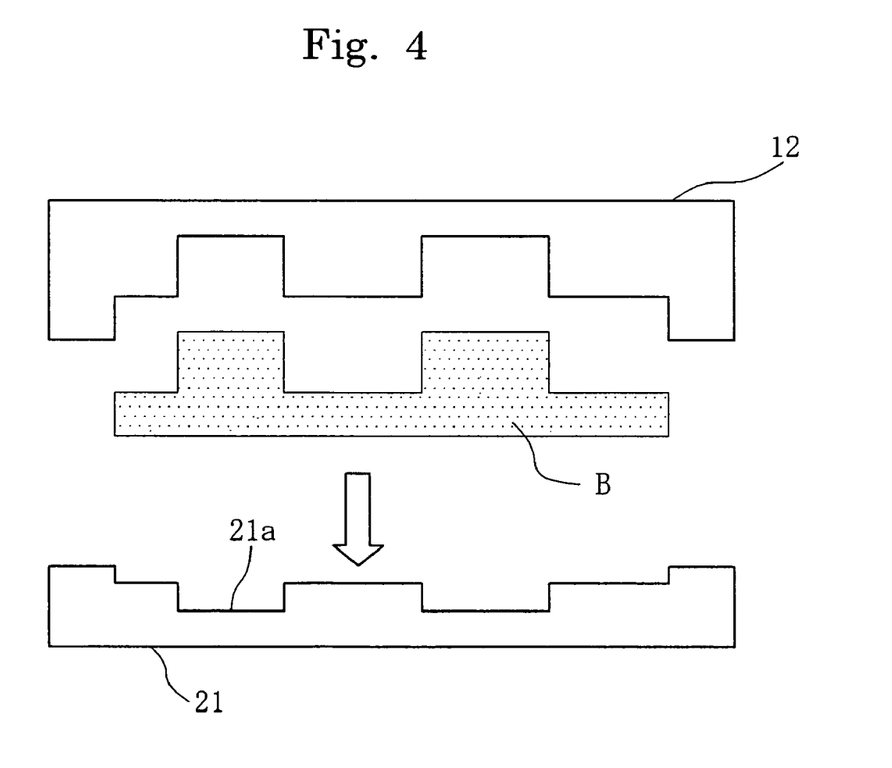
FIG. 4 is a diagram showing a state in which a temporary casting is dropped into a bottom mold for casting.

FIG. 4 is a diagram showing a state in which a temporary cast is dropped into a bottom mold for casting. As shown in FIG. 4, the filling container 12 holding the temporary cast B is brought to a point above a bottom mold 21 for casting and precisely positioned using positioning pins or the like, and the filling container is lightly struck with a hammer or the like, whereupon the temporary cast B falls into the bottom mold 21. This method permits the powdered raw material A to be dropped with uniform consistency into the mold even where the powdered raw material A are only fused together to the extent that the temporary cast B crumbles if an attempt is made to remove it from the filling container 12 by any means other than gravity and therefore cannot be removed as is from the filling container 12. Thereafter, a top mold 22 (see FIGS. 5A, 5B and 5C and FIGS. 6A, 6B and 6C) is lowered onto the bottom mold 21 and pressure and heat are applied to form a fuel cell bipolar plate, which is then compressed to a fraction of its original thickness to form the fuel cell bipolar plate 1 shown in FIG. 8. At this time, the temperature is at or above the setting temperature of thermosetting resin (if a thermosetting resin is used) or at or above the glass transition point of thermoplastic resin (if a thermoplastic resin is used).

Next, a description is given of the relation between the depth of the pattern formed in the filling container 12 and the thicknesses of the fuel cell bipolar plate 1.

Figure 5A:
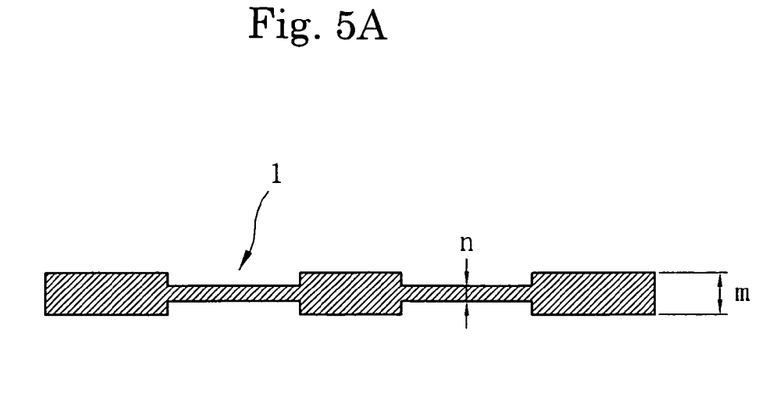
FIGS. 5A, 5B and 5C are diagrams illustrating a case in which a pattern is not formed in the filling container.
Figure 5B:
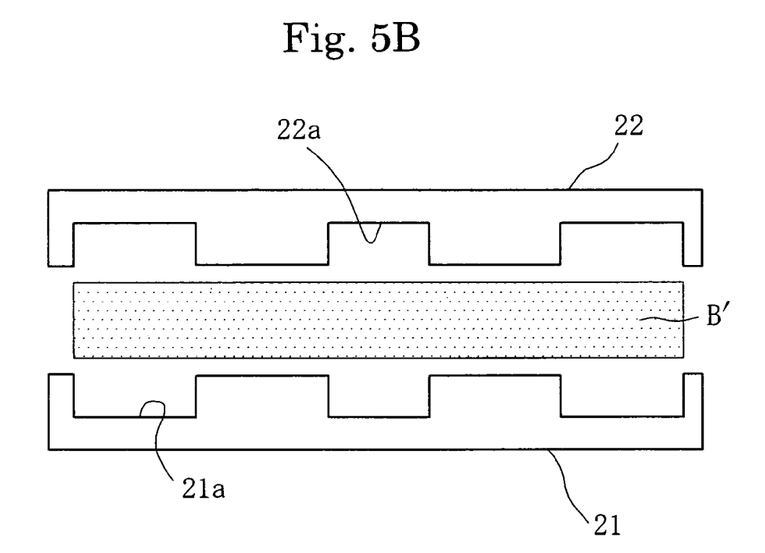
Figure 5C:
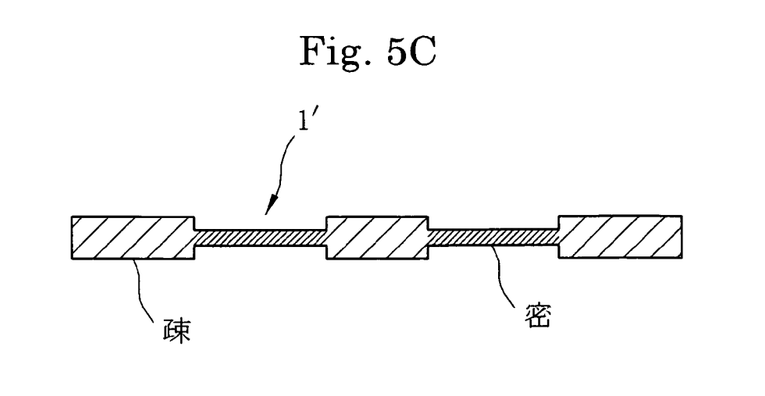

FIGS. 5A, 5B and 5C are diagrams illustrating a case in which a pattern is not formed in the filling container. FIG. 5A shows a cross-sectional view of the shape of the fuel cell bipolar plate 1. In this example, as shown in FIG. 5A, a pattern 1a is formed on the fuel cell bipolar plate 1 having two different areas of thickness, that is, thick portions m and thin portions n. The thin portions correspond to grooves in the molds 21, 22 and the thick portions correspond to areas between the grooves in the molds 21, 22. In such a case, it is preferable that the fuel cell bipolar plate 1 be given the same density in both thick and thin portions alike.

As shown in FIG. 5B, patterns 21a and 22a for forming the pattern 1a of the fuel cell bipolar plate 1 are formed on the top mold 22 and the bottom mold 21. If no pattern is formed in the filling container 2, then a temporary cast B' can be formed having a fixed thickness throughout as shown in FIG. 5B. If such a temporary cast B' is placed between the top mold 21 and the bottom mold 22, then, as shown in FIG. 5C, the thin portions will be of greater density than the thick portions, which is undesirable.

Figure 6A:
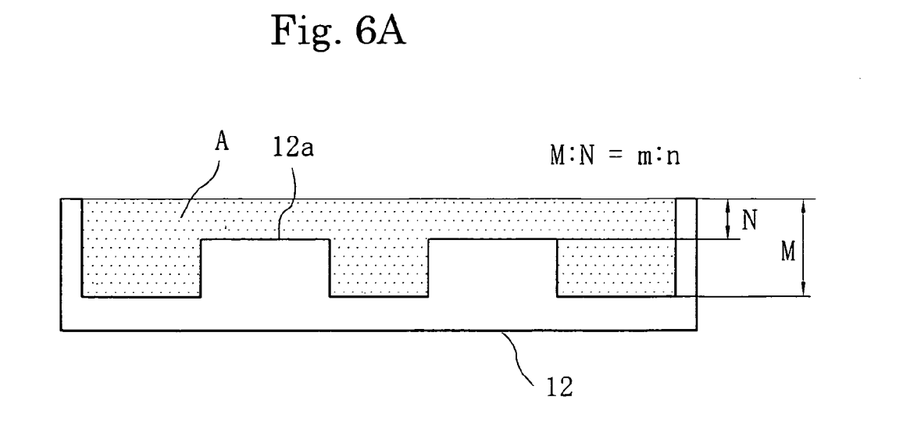
FIGS. 6A, 6B and 6C are diagrams illustrating a case in which a pattern is formed in the filling container.
Figure 6B:
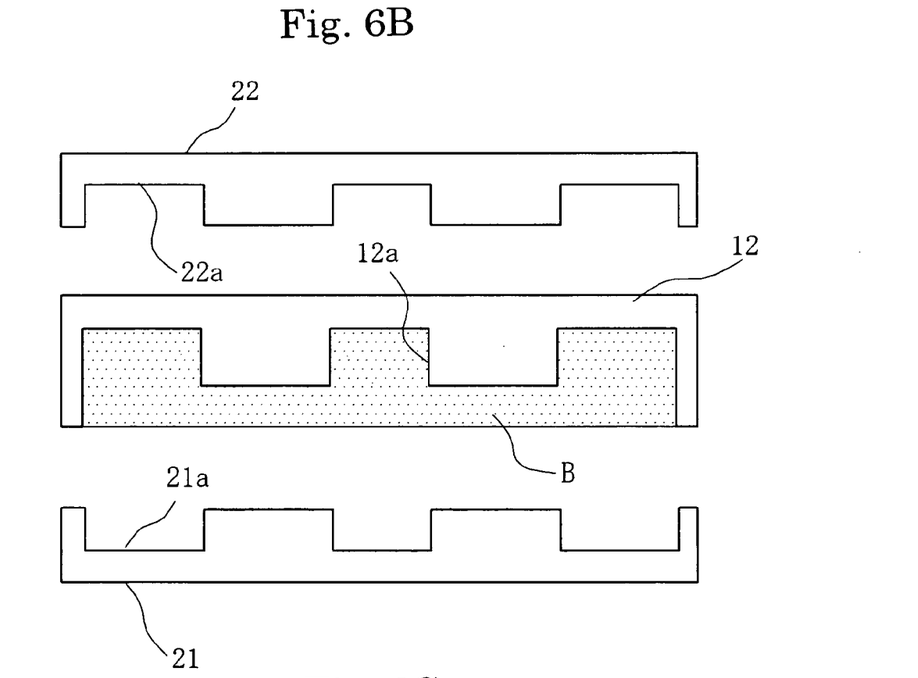
Figure 6C:
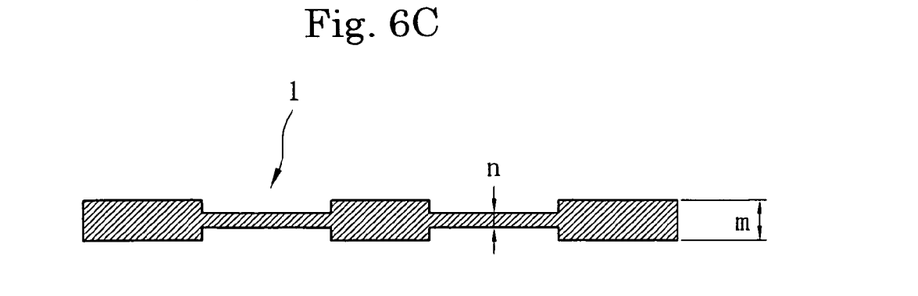

Accordingly, in the present invention, a pattern 12a is formed in the filling container 12 as shown in FIGS. 6A, 6B and 6C, such that the relation between the depth of deep portions M of the pattern 12a and the depth of shallow portions N of the pattern 12a shown in FIG. 6A, on the one hand, and the thickness of the thick portions m of the fuel cell bipolar plate 1 and the thickness of the thin portions n of the fuel cell bipolar plate 1 shown in FIG. 5A satisfies the formula:

$$M:N=m:n$$

FIGS. 6A, 6B and 6C are diagrams illustrating a case in which a pattern is formed in the filling container. As shown in FIGS. 6A, 6B and 6C, since the pattern 12a is formed on the filling container 12 for the reason described above it is possible to obtain a fuel cell bipolar plate 1 of consistent form without localized disparities in density.

It should be noted that, although the pattern 1a of the fuel cell bipolar plate 1 and the pattern 12a of the filling container 12, may be made identical, where the pattern 1a is fine it is not necessary to form the same pattern as pattern 1a in the filling container 12. Faithfully reproducing the pattern 1a of the fuel cell bipolar plate 1 in the filling container 12 creates problems when the temporary cast B is dropped into the mold. Specifically, there is a possibility that the temporary cast B does not drop smoothly from the filling container 12 into the mold, with portions of the temporary cast B remaining in the filling container 12. Rather, where the pattern 1a is fine, it is possible to take the average value of the concavities and convexities of the pattern 1a and cast a fuel cell bipolar plate 1 of substantially uniform density.

Consequently, the present invention uses the filling container 12 only to apply heat without applying pressure to the powdered raw material A to form a temporary cast B, therefore rendering large-scale equipment such as a press or the like unnecessary, enabling the cost of production of the fuel cell bipolar plate to be reduced and moreover improve production efficiency. Furthermore, the temporary casting is not manually handled directly, making it possible to eliminate the risk of decreased yields due to impurities contaminating the temporary casting or damage to the temporary casting.

In addition, in the present embodiment, the time required to cast a fuel cell bipolar plate with the casting mold in one production cycle is approximately 5 minutes. By contrast, the time required for the preliminary preparations of dropping the powdered raw material into the filling container, heating it and dropping it into the mold is 3-4 minutes. Therefore, preparations can be completed while the fuel cell bipolar plate is being cast with the casting mold, thus permitting production time to be reduced.

It should be noted that if the time required for the foregoing preliminary preparations is longer than the time required to cast with the casting mold, then production time can be reduced by producing a large number of temporary castings in advance.

In addition, the powdered raw material A can be dropped evenly into the filling container 12 and moreover the fuel cell bipolar plate 1 can be produced without localized disparities in dimension and density, and therefore warps do not occur in the completed fuel cell bipolar plate 1 and the difference d between the maximum thickness Tmax and the minimum thickness Tmin can be reduced.

Next, a numerical comparison of the embodiment of the present invention and the conventional art is given.

Figure 7:
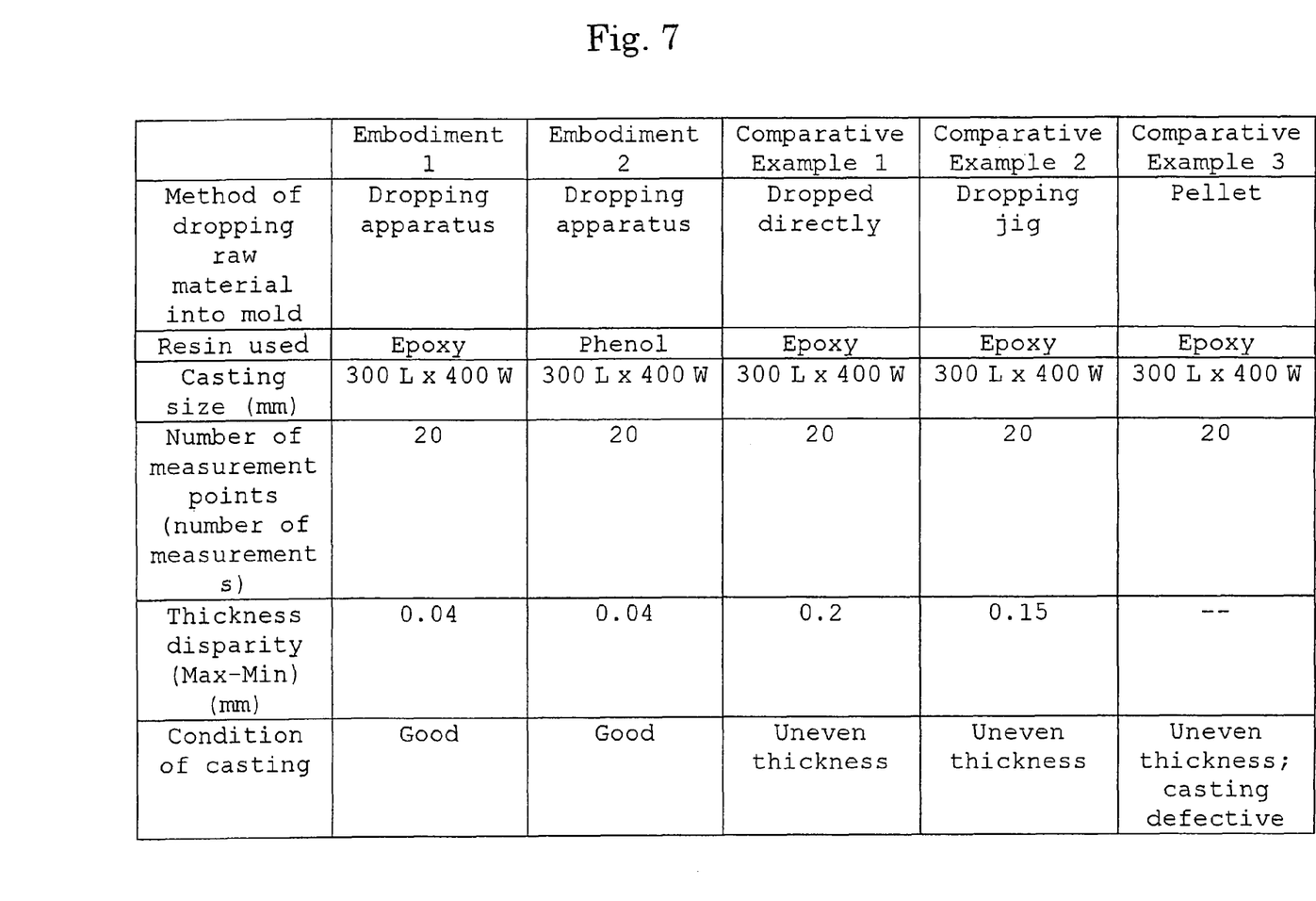
FIG. 7 is a table comparing fuel cell bipolar plates manufactured by the method of the present invention and by the conventional method.

FIG. 7 is a table comparing fuel cell bipolar plates manufactured by the method of the present invention and those by the conventional method. The compositions of embodiments 1 and 2 and of comparative examples 1, 2 and 3 are such that all use 25 parts by weight resin and 100 parts by weight granular graphite, and all use powdered raw material of the same composition except for embodiment 2, which uses phenol resin for the resin.

Embodiments 1 and 2 drop powdered raw material into a filling container using the drop apparatus shown in FIG. 1 and heat the powdered raw material to produce a temporary casting, which is then dropped into a mold to form a fuel cell bipolar plate. Comparative example 1 drops the powdered raw material directly in to the mold, and comparative example 2 uses the dropping jig described in Japanese Laid-Open Patent Publication (Kokai) No. 2001-62858. Comparative example 3 forms pellets from the powdered raw material, which are then dropped into the mold. The pressure and heating temperature, and the compression and heating times, are the same for all embodiments and comparative examples.

The measurement points of the cast fuel cell bipolar plate are determined in advance and are the same 20 points, measured using a micrometer, for embodiments 1 and 2 and for comparative examples 1, 2 and 3. The thickness of the fuel cell bipolar plate is different at each of the measurement points, and therefore, in order to determine the extent of any inconsistency or unevenness in thickness, the standard thickness for the measurement points is set at 0 and the actual measured thickness is expressed in terms of being thicker or thinner than the standard thickness to obtain the difference between the points of maximum and minimum thickness, that is, the thickest and the thinnest points (dimensional accuracy). The condition of the casting is checked by ultrasound to detect the presence of areas of uneven density.

Unevenness in thickness (dimensional accuracy) of both embodiments 1 and 2 is 0.04 mm, which is very high accuracy compared to the 0.2 mm of comparative example 1 and 0.15 mm of comparative example 2. Moreover, whereas the condition of the casting shows localized disparities in density in comparative examples 1 and 2, that of embodiments 1 and 2 is good.

As many apparently widely different embodiments of the present invention can be made without departing from the spirit and scope thereof, it is to be understood that the invention is not limited to the specific preferred embodiments described above thereof except as defined in the claims.

What is claimed is:

1. A method of manufacturing a fuel cell bipolar plate to obtain a fuel cell bipolar plate of consistent form without localized disparities in density, the method comprising:
   a step of dropping powdered raw material containing electrically conductive material and resin into a filling container,
   the powdered raw material being put into a hopper and dropped from a supply port at a bottom of the hopper while maintaining a fixed distance between the supply port at a bottom of the hopper and the filling container and moving the hopper and the filling container relative to each other,
   the supply port of the hopper being slid over the top of the filling container so as to level off the powdered raw material dropped into the filling container;
   a step of heating, without pressure, the powdered raw material within the filling container to melt the resin and form the powdered raw material into a temporary casting; and
   a step of dropping the temporary casting into a mold in which a predetermined pattern is formed and heating and compressing the temporary casting to form the fuel cell bipolar plate,
   wherein the predetermined pattern formed in the mold is such that a relation between a depth of deep portions M of the pattern and a depth of shallow portions N of the pattern, and a thickness of thick portions m of the fuel cell bipolar plate and a thickness of thin portions n of the fuel cell bipolar plate, satisfies the formula $M:N \approx m:n$.

2. The method of manufacturing a fuel cell bipolar plate according to claim 1, wherein the resin contains thermosetting resin,
   a temperature at which the powdered raw material is heated to melt the resin being higher than the melting point of the thermosetting resin but lower than the setting temperature of the thermosetting resin, a temperature at which the temporary casting is heated to form the fuel cell bipolar plate being higher than the setting temperature of the thermosetting resin.

3. The method of manufacturing a fuel cell bipolar plate according to claim 1, wherein the resin contains crystalline thermoplastic resin, a temperature at which the powdered raw material is heated to melt the resin being higher than the melting point of the crystalline thermoplastic resin but lower than the dissolution temperature of the crystalline thermoplastic resin, a temperature at which the temporary casting is heated to form the fuel cell bipolar plate being higher than the glass transition point of the crystalline thermoplastic resin.

4. The method of manufacturing a fuel cell bipolar plate according to claim 1, wherein the resin contains amorphous thermoplastic resin, a temperature at which the powdered raw material is heated to melt the resin being higher than the glass transition point of the amorphous thermoplastic resin but lower than the dissolution temperature of the amorphous thermoplastic resin, a temperature at which the temporary casting is heated to form the fuel cell bipolar plate being higher than. the glass transition point of the amorphous thermoplastic resin.

5. The method of manufacturing a fuel cell bipolar plate according to claim 1, wherein the resin contains thermosetting resin, a temperature at which the powdered raw material is heated to melt the resin being within a range of from the melting point of the resin to the melting point of the resin plus 50 degrees Centigrade, a temperature at which the powdered raw material is heated to form the fuel cell bipolar plate being higher than the setting temperature of the thermosetting resin.

* * * * *